United States Patent
Wang et al.

(10) Patent No.: US 12,147,671 B2
(45) Date of Patent: Nov. 19, 2024

(54) PERFORMANCE MATCH METHOD OF MEMORY, MEMORY STORAGE DEVICE AND MEMORY CONTROL CIRCUIT UNIT

(71) Applicant: Hefei Core Storage Electronic Limited, Anhui (CN)

(72) Inventors: Chih-Ling Wang, Anhui (CN); Dong Dong Yao, Anhui (CN); Yun Peng Zhang, Anhui (CN); Kuai Cao, Anhui (CN); En Yang Wang, Anhui (CN); Wen Qing Lv, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 18/190,147

(22) Filed: Mar. 27, 2023

(65) Prior Publication Data
US 2024/0289017 A1    Aug. 29, 2024

(30) Foreign Application Priority Data

Feb. 24, 2023   (CN) .......................... 202310184472.6

(51) Int. Cl.
*G06F 3/06*        (2006.01)
(52) U.S. Cl.
CPC ............ *G06F 3/061* (2013.01); *G06F 3/0634* (2013.01); *G06F 3/0679* (2013.01)
(58) Field of Classification Search
CPC ....... G06F 3/061; G06F 3/0634; G06F 3/0679
See application file for complete search history.

(56) References Cited

U.S. PATENT DOCUMENTS

| | | | |
|---|---|---|---|
| 2018/0341403 A1* | 11/2018 | Canepa | G06F 13/16 |
| 2019/0018611 A1* | 1/2019 | Kim | G06F 3/0625 |
| 2019/0065412 A1* | 2/2019 | Qiu | G06F 3/0635 |
| 2020/0042208 A1* | 2/2020 | Roberts | G06F 3/0605 |
| 2020/0409602 A1* | 12/2020 | Lee | G06F 12/0246 |
| 2021/0004175 A1* | 1/2021 | Zhu | G06F 3/0655 |
| 2021/0232336 A1 | 7/2021 | Marripudi et al. | |
| 2021/0377590 A1* | 12/2021 | Muthiah | H04L 65/80 |
| 2022/0334769 A1* | 10/2022 | Kim | G06F 3/0634 |
| 2022/0397953 A1* | 12/2022 | Wang | G06F 1/3225 |
| 2023/0046912 A1* | 2/2023 | Veches | G11C 16/30 |
| 2024/0053909 A1* | 2/2024 | Katougi | G06F 3/0679 |

FOREIGN PATENT DOCUMENTS

| | | |
|---|---|---|
| TW | 202117550 | 5/2021 |
| TW | 202238375 | 10/2022 |
| TW | 202240575 | 10/2022 |

OTHER PUBLICATIONS

"Office Action of Taiwan Counterpart Application", issued on Dec. 11, 2023, p. 1-p. 8.

\* cited by examiner

*Primary Examiner* — Sean D Rossiter
(74) *Attorney, Agent, or Firm* — JCIPRNET (57) ABSTRACT

A performance match method of memory, a memory storage device and a memory control circuit unit are disclosed. The method includes: receiving a performance match command from a host system; in response to the performance match command, adjusting an operation setting of a memory storage device to match a performance of the memory storage device with a performance requirement of the host system; and interacting with the host system based on the adjusted operation setting.

15 Claims, 5 Drawing Sheets

PERFORMANCE MATCH METHOD OF MEMORY, MEMORY STORAGE DEVICE AND MEMORY CONTROL CIRCUIT UNIT

CROSS-REFERENCE TO RELATED APPLICATION

This application claims the priority benefit of China application serial no. 202310184472.6, filed on Feb. 24, 2023. The entirety of the above-mentioned patent application is hereby incorporated by reference herein and made a part of this specification.

BACKGROUND

Technical Field

The disclosure relates to a memory management technology, and in particular relates to a performance match method of memory, a memory storage device, and a memory control circuit unit.

Description of Related Art

As smartphones, tablets, and personal computers have grown rapidly in recent years, the demand of the consumers for storage media has also increased rapidly. Since a rewritable non-volatile memory module (e.g. a flash memory) has the characteristics of data non-volatility, power saving, small size, and having no mechanical structure, it is very suitable for being built in a variety of portable multimedia devices as exemplified above.

Generally, various operating parameters of a memory storage device including a rewritable non-volatile memory module or a memory controller for controlling a rewritable non-volatile memory module are set to preset values before leaving the factory. After leaving the factory, the memory storage device or the memory controller may execute various operations based on these operating parameters, such as executing internal data access. However, in practice, different types of host systems may have different performance requirements for memory storage devices. In addition, when the operating environment changes, the preset operating parameters may not be able to meet the current performance requirement of the host system. The above-mentioned situation may not only reduce the operating efficiency of the memory storage device, but may also cause compatibility problems between the memory storage device and the host system.

SUMMARY

The disclosure provides a performance match method of memory, a memory storage device, and a memory control circuit unit, which may improve the aforementioned issues.

An exemplary embodiment of the disclosure provides a performance match method of memory, which is configured in a memory storage device. The performance match method of the memory includes the following operation. A performance match command is received from a host system. In response to the performance match command, an operation setting of a memory storage device is adjusted to match a performance of the memory storage device with a performance requirement of the host system. The host system is interacted with based on an adjusted operation setting.

An exemplary embodiment of the disclosure further provides a memory storage device, which includes a connection interface unit, a rewritable non-volatile memory module, and a memory control circuit unit. The connection interface unit is configured to couple to a host system. The memory control circuit unit is coupled to the connection interface unit and the rewritable non-volatile memory module. The memory control circuit unit is configured for the following operation. A performance match command is received from a host system. In response to the performance match command, an operation setting of a memory storage device is adjusted to match a performance of the memory storage device with a performance requirement of the host system. The host system is interacted with based on an adjusted operation setting.

An exemplary embodiment of the disclosure further provides a memory control circuit unit for controlling a rewritable non-volatile memory module. The memory control circuit unit includes a host interface, a memory interface, and a memory management circuit. The host interface is configured to couple to the host system. The memory interface is configured to couple to the rewritable non-volatile memory module. The memory management circuit is coupled to the host interface and the memory interface. The memory management circuit is configured for the following operation. A performance match command is received from a host system. In response to the performance match command, an operation setting of a memory storage device is adjusted to match a performance of the memory storage device with a performance requirement of the host system. The host system is interacted with based on an adjusted operation setting.

Based on the above, after receiving the performance match command from the host system, the operation setting of the memory storage device may be dynamically adjusted in response to the performance match command, so that the performance of the memory storage device matches the performance requirement of the host system. Thereafter, the memory storage device may interact with the host system based on the adjusted operation setting. In this way, no matter what the original factory settings are, the performance of the memory storage device may be dynamically adjusted to meet the requirements of the host system, thereby improving the operating performance of the memory storage device and/or avoiding compatibility problems between the memory storage device and the host system after leaving the factory.

DETAILED DESCRIPTION OF DISCLOSED EMBODIMENTS

References of the exemplary embodiments of the disclosure are to be made in detail. Examples of the exemplary embodiments are illustrated in the drawings. If applicable, the same reference numerals in the drawings and the descriptions indicate the same or similar parts.

In general, a memory storage device (also referred to as a memory storage system) includes a rewritable non-volatile memory module and a controller (also referred to as a control circuit). The memory storage device may be configured with a host system so that the host system may write data to or read data from the memory storage device.

Figure 1:
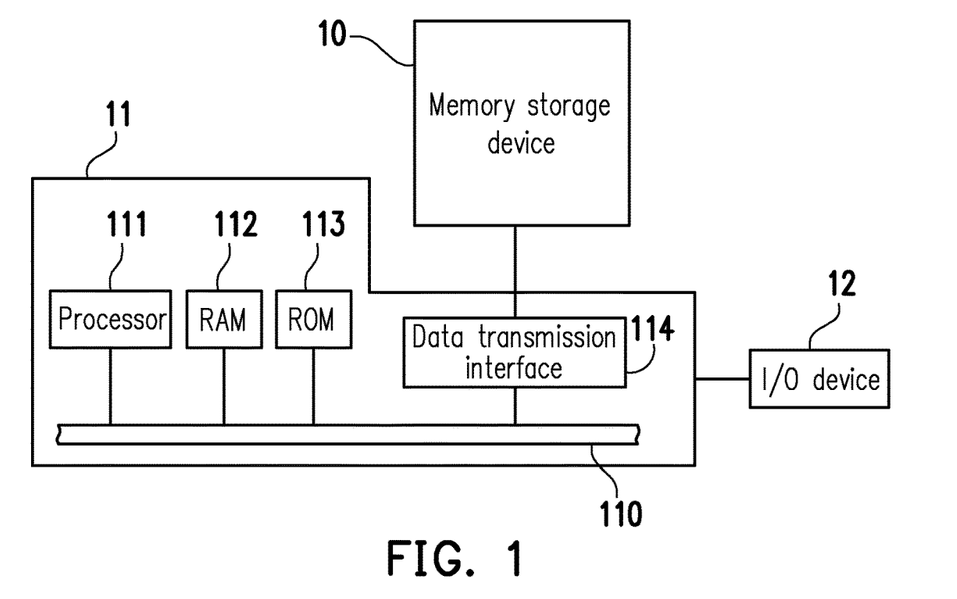
FIG. 1 is a schematic diagram of a host system, a memory storage device, and an input/output (I/O) device according to an exemplary embodiment of the disclosure.
Figure 2:
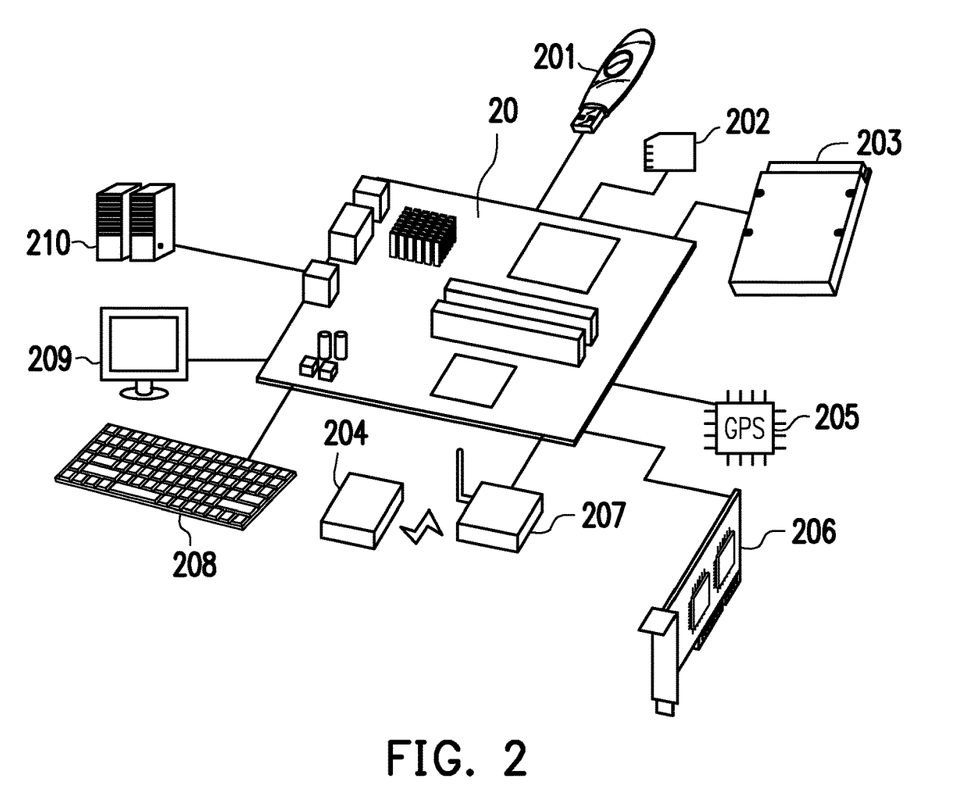
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Referring to FIG. 1 and FIG. 2, a host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to a memory storage device 10 through the data transfer interface 114. For example, the host system 11 may store data to or read data from the memory storage device 10 via the data transmission interface 114. In addition, the host system 11 may be coupled to an I/O device 12 through the system bus 110. For example, the host system 11 may transmit output signals to or receive input signals from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. The motherboard 20 may be coupled to the memory storage device 10 through the data transmission interface 114 via a wired or wireless connection.

In an exemplary embodiment, the memory storage device 10 may be, for example, a flash drive 201, a memory card 202, a solid state drive (SSD) 203, or a wireless memory storage device 204. The wireless memory storage device 204 may be a memory storage device based on various wireless communication technologies, such as a near field communication (NFC) memory storage device, a wireless fax (WiFi) memory storage device, a Bluetooth memory storage device, a low power Bluetooth memory storage device (e.g. iBeacon), etc. In addition, the motherboard 20 may also be coupled to various I/O devices, such as a global positioning system (GPS) module 205, a network interface card 206, a wireless transmission device 207, a keyboard 208, a screen 209, a speaker 210, etc., through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include the memory storage device 30 and the host system 31 of FIG. 3.

Figure 3:
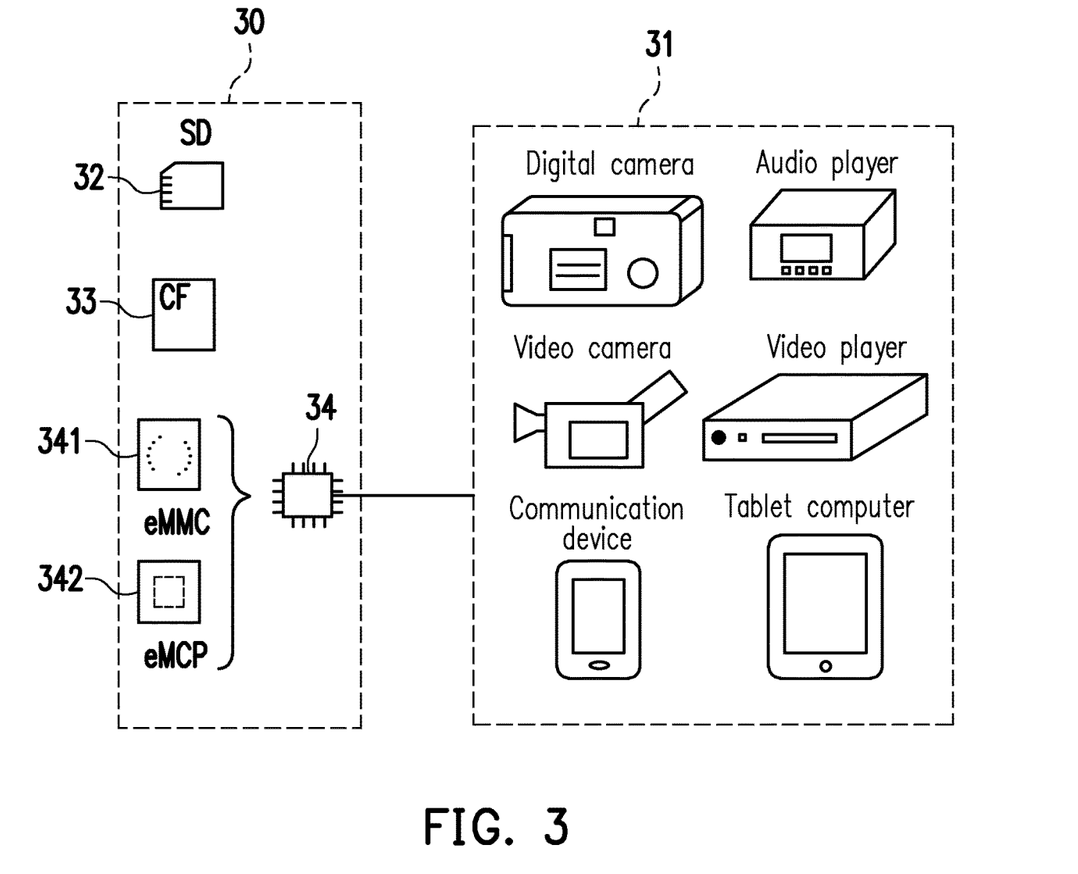
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Referring to FIG. 3, the memory storage device 30 may be configured in conjunction with the host system 31 to store data. For example, the host system 31 may be a digital camera, a video camera, a communication device, an audio player, a video player, or a tablet computer system. For example, the memory storage device 30 may be various non-volatile memory storage devices, such as a secure digital (SD) card 32, a compact flash (CF) card 33, or an embedded storage device 34, etc., configured in the host system 31. The embedded storage device 34 includes various embedded storage devices that directly couple a memory module to a substrate of the host system, such as an embedded multimedia card (eMMC) 341 and/or an embedded multi-chip package (eMCP) storage device 342, etc.

Figure 4:
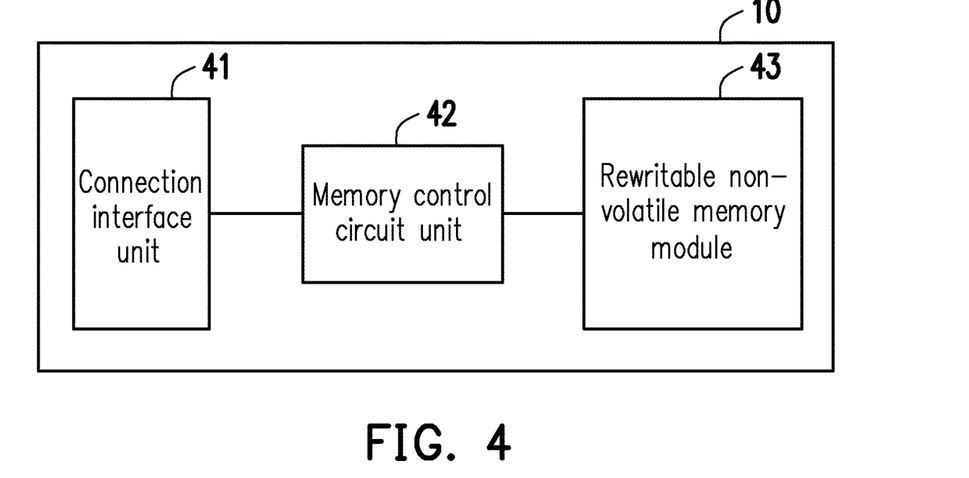
FIG. 4 is a schematic diagram of a memory storage device according to an exemplary embodiment of the disclosure.

FIG. 4 is a schematic diagram of a memory storage device according to an exemplary embodiment of the disclosure. Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI Express) standard. In an exemplary embodiment, the connection interface unit 41 may also be compliant to the serial advanced technology attachment (SATA) standard, the parallel advanced technology attachment (PATA) standard, the institute of electrical and electronics engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 may be packaged in a chip with the memory control circuit unit 42, or the connection interface unit 41 may be disposed outside a chip including the memory control circuit unit 42.

The memory control circuit unit 42 is coupled to the connection interface unit 41 and the rewritable non-volatile memory module 43. The memory control circuit unit 42 is configured to execute multiple logic gates or control commands implemented in a hardware form or a firmware form and to perform operations such as writing, reading, and erasing of data in the rewritable non-volatile memory module 43 according to the commands of the host system 11.

The rewritable non-volatile memory module 43 is configured to store the data written by the host system 11. The rewritable non-volatile memory module 43 may include a single level cell (SLC) NAND-type flash memory module (i.e., a flash memory that may store 1 bit in one memory cell), multi-level cell (MLC) NAND-type flash memory module (i.e., a flash memory module that may store 2 bits in one memory cell), a triple level cell (TLC) NAND-type flash memory module (i.e., a flash memory module that may store 3 bits in one memory cell), a quad level cell (QLC) NAND-type flash memory module (i.e., a flash memory module that may store 4 bits in one memory cell), other flash memory modules, or other memory modules with the same characteristics.

Each memory cell in the rewritable non-volatile memory module 43 stores one or more bits by a change in a voltage (also referred to as a threshold voltage hereinafter). Specifically, there is a charge trapping layer between a control gate and a channel of each of the memory cells. By applying a write voltage to the control gate, the amount of electrons in the charge trapping layer may be changed, thereby changing the threshold voltage of the memory cell. This operation of changing the threshold voltage of the memory cell is also referred to as "writing data to the memory cell" or "programming the memory cell". As the threshold voltage changes, each of the memory cells in the rewritable non-volatile memory module 43 has multiple storage states. By applying a read voltage, it may be determined which storage state a memory cell belongs to, thereby obtaining the one or more bits stored in the memory cell.

In an exemplary embodiment, the memory cells of the rewritable non-volatile memory module 43 may constitute multiple physical programming units, and the physical programming units may constitute multiple physical erasing units. Specifically, memory cells on the same word line may form one or more physical programming units. If each memory cell may store two or more bits, the physical programming units on the same word line may be classified at least as lower physical programming units and upper physical programming units. For example, the least significant bit (LSB) of a memory cell belongs to a lower physical programming unit, and the most significant bit (MSB) of a memory cell belongs to an upper physical programming unit. Generally, in an MLC NAND flash memory, the write speed of the lower physical programming unit is greater than the write speed of the upper physical programming unit, and/or the reliability of the lower physical programming unit is higher than the reliability of the upper physical programming unit.

In the present exemplary embodiment, the physical programming unit is the minimum unit for programming. That is, the physical programming unit is the minimum unit for write data. For example, the physical programming unit may be a physical page or a physical sector. If the physical programming unit is a physical page, then the physical programming unit may include a data bit area and a redundancy bit area. The data bit area includes multiple physical sectors is configured to store user data, and the redundant bit area is configured to store system data (e.g., management data such as error correction codes). In an exemplary embodiment, the data bit area includes 32 physical sectors, and the size of a physical sector is 512 bytes (B). However, in other exemplary embodiments, the data bit area may also include 8, 16, or a greater or lesser number of physical sectors, and the size of each of the physical sectors may also be larger or smaller. On the other hand, the physical erasing unit is the minimum unit for erasing. That is, each of the physical erasing units includes the smallest number of memory cells to be erased together. For example, the physical erasing unit is a physical block.

Figure 5:
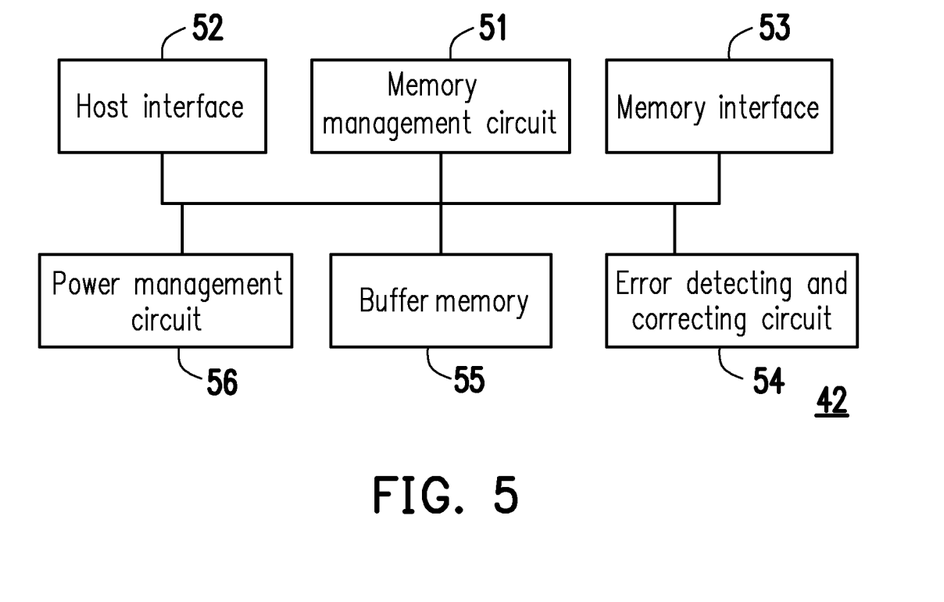
FIG. 5 is a schematic diagram of a memory control circuit unit according to an exemplary embodiment of the disclosure.

FIG. 5 is a schematic diagram of a memory control circuit unit according to an exemplary embodiment of the disclosure. Referring to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has multiple control commands, and when the memory storage device 10 operates, the control commands are executed to perform operations such as writing, reading, and erasing data. The following description of the operation of the memory management circuit 51 is equivalent to the description of the operation of the memory control circuit unit 42.

In an exemplary embodiment, the control commands of the memory management circuit 51 are implemented in a firmware form. For example, the memory management circuit 51 has a microprocessor unit (not shown) and a read only memory (not shown), and the control commands are programmed into the read only memory. When the memory storage device 10 operates, the control commands are executed by the microprocessor unit to perform operations such as writing, reading, and erasing data.

In an exemplary embodiment, the control commands of the memory management circuit 51 may also be stored in a specific area of the rewritable non-volatile memory module 43 (for example, a system area dedicated to storing system data in the memory module) in a program code form. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. Thereafter, the microprocessor unit runs these control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cells or a memory cell group of the rewritable non-volatile memory module 43. The memory writing circuit is configured to issue a write command sequence to the rewritable non-volatile memory module 43 to write data into the rewritable non-volatile memory module 43. The memory reading circuit is configured to issue a read command sequence to the rewritable non-volatile memory module 43 to read data from the rewritable non-volatile memory module 43. The memory erasing circuit is configured to issue an erase command sequence to the rewritable non-volatile memory module 43 to erase data from the rewritable non-volatile memory module 43. The data processing circuit is configured to process the data to be written into the rewritable non-volatile memory module 43 and the data read from the rewritable non-volatile memory module 43. The write command sequence, the read command sequence and the erase command sequence may respectively include one or more program codes or command codes for instructing the rewritable non-volatile memory module 43 to perform corresponding writing, reading, and erasing operations. In an exemplary embodiment, the memory management circuit 51 may also issue other types of command sequences to the rewritable non-volatile memory module 43 to instruct the rewritable non-volatile memory module 43 to perform corresponding operations.

The host interface 52 is coupled to the memory management circuit 51. The memory management circuit 51 may communicate with the host system 11 through the host interface 52. The host interface 52 may be configured to receive and identify the commands and data transmitted by the host system 11. For example, the commands and data transmitted by the host system 11 may be transmitted to the memory management circuit 51 through the host interface 52. In addition, the memory management circuit 51 may transmit data to the host system 11 through the host interface 52. In this exemplary embodiment, the host interface 52 is compatible with the PCI Express standard. However, it should be understood that the disclosure is not limited thereto, and the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is configured to access the rewritable non-volatile memory module 43. For example, the memory management circuit 51 may access the rewritable non-volatile memory module 43 through the memory interface 53. In other words, the data to be written into the rewritable non-volatile memory module 43 is converted into a format acceptable to the rewritable non-volatile memory module 43 via the memory interface 53. Specifically, if the memory management circuit 51 is to access the rewritable non-volatile memory module 43, the memory interface 53 transmits a corresponding command sequence. For example, the command sequences may include a write command sequence to instruct data writing, a read command sequence to instruct data reading, an erase command sequence to instruct data erasing, and corresponding command sequences for instructing various memory operations (e.g., changing the read voltage level, executing a garbage collection operation, etc.). These command sequences are, for example, generated by the memory management circuit 51 and transmitted to the rewritable non-volatile memory module 43 via the memory interface 53. These command sequences may include one or more signals or data on the bus. The signals or data may include command codes or program codes. For example, the read command sequence includes information such as the read identification code, the memory address, etc.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is configured to execute an error detecting and correcting operation to ensure the correctness of the data. Specifically, when the memory management circuit 51 receives a write command from the host system 11, the error detecting and correcting circuit 54 generates a corresponding error correcting code (ECC) and/or error detecting code (EDC) for the data corresponding to the write command, and the memory management circuit 51 writes the data corresponding to the write command and the corresponding error correcting code and/or error detecting code to the rewritable non-volatile memory module 43. Thereafter, when the memory management circuit 51 reads data from the rewritable non-volatile memory module 43, it simultaneously reads the error correcting code and/or the error detecting code corresponding to the data, and the error detecting and correcting circuit 54 executes the error detecting and correcting operation on the read data according to the error correcting code and/or error detecting code.

The buffer memory 55 is coupled to the memory management circuit 51 and configured to temporarily store data. The power management circuit 56 is coupled to the memory management circuit 51 and configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
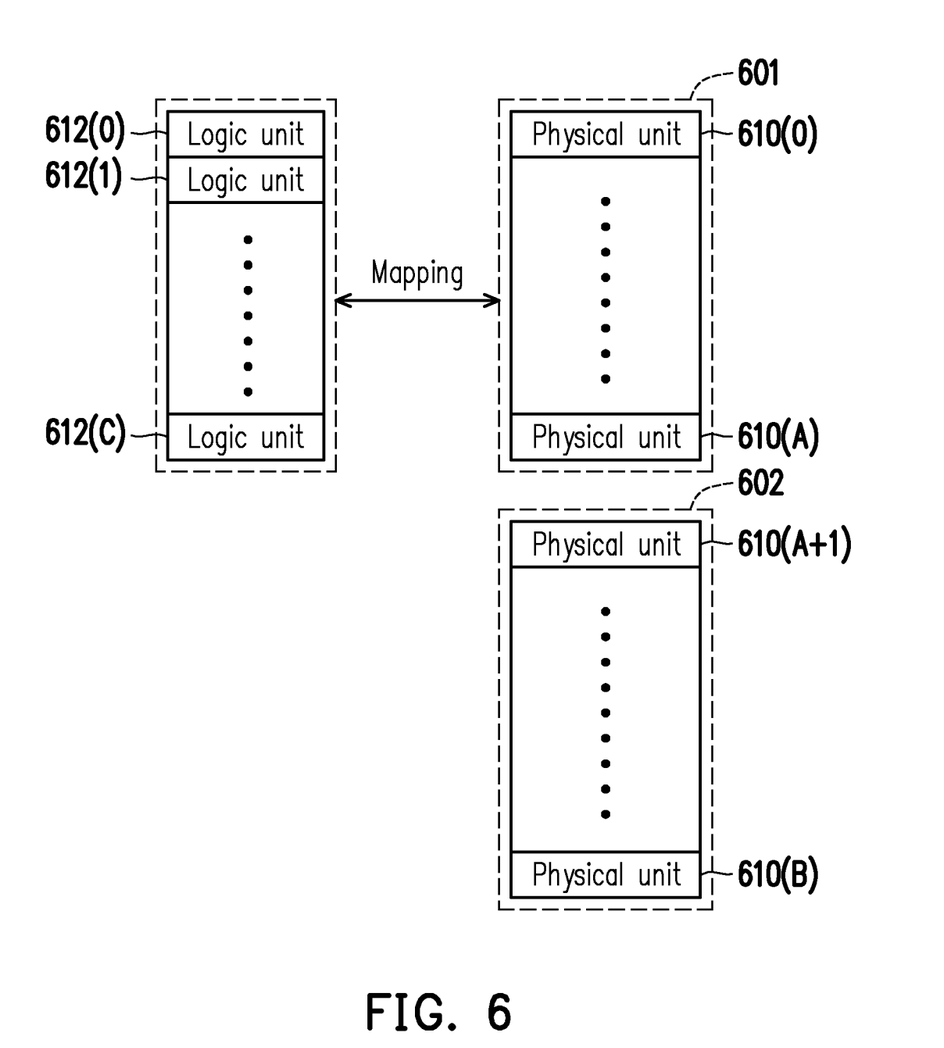
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Referring to FIG. 6, the memory management circuit 51 may logically group the physical units 610(0) to 610(B) in the rewritable non-volatile memory module 43 into a storage area 601 and a spare area 602. For example, a physical unit may include one or more physical programming units.

The physical units 610(0) to 610(A) in the storage area 601 are configured to store user data (e.g., user data from the host system 11 of FIG. 1). For example, the physical units 610(0) to 610(A) in the storage area 601 may store valid data and invalid data. The physical units 610(A+1) to 610(B) in the spare area 602 do not store data (e.g., valid data). For example, if a certain physical unit does not store valid data, this physical unit may be associated (or added) to the spare area 602. In addition, the physical units in the spare area 602 (or the physical units not storing valid data) may be erased. When new data is written, one or more physical units may be extracted from the spare area 602 to store the new data. In an exemplary embodiment, the spare area 602 is also referred to as a free pool.

The logical units 612(0) to 612(C) may be configured in the memory management circuit 51 to map the physical units 610(0) to 610(A) in the storage area 601. In an exemplary embodiment, each of the logical units corresponds to a logical address. For example, a logical address may include one or more logical block addresses (LBA) or other logical management units. In an exemplary embodiment, a logical unit may also correspond to a logical programming unit or be formed by multiple consecutive or non-consecutive logical addresses.

It should be noted that a logical unit may be mapped to one or more physical units. If a certain physical unit is currently mapped by a certain logical unit, it means that the data currently stored in this physical unit includes valid data. On the contrary, if a certain physical unit is not currently mapped by any logical unit, it means that the data currently stored in this physical unit is invalid data.

The memory management circuit 51 may record the mapping information (also referred to as the logical to physical mapping information) describing the mapping relationship between logical units and physical units in at least one mapping table (also referred to as the logical to physical mapping table). When the host system 11 reads data from the memory storage device 10 or writes data to the memory storage device 10, the memory management circuit 51 may access the rewritable non-volatile memory module 43 according to the information in the mapping table (i.e., the mapping information).

Figure 7:
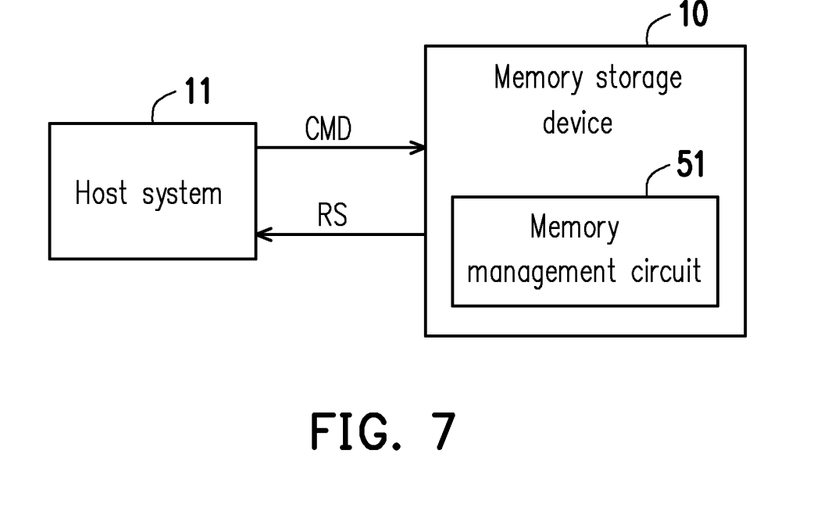
FIG. 7 is a schematic diagram illustrating communication between a memory storage device and a host system according to an exemplary embodiment of the disclosure.

FIG. 7 is a schematic diagram illustrating communication between a memory storage device and a host system according to an exemplary embodiment of the disclosure.

Referring to FIG. 7, in an exemplary embodiment, the memory management circuit 51 may receive a command (also referred to as a performance match command) CMD from the host system 11. The command CMD may be configured to provide the performance requirement of the host system 11 to the memory storage device 10. In response to the command CMD, the memory management circuit 51 may adjust a portion of the operation settings inside the memory storage device 10, so that the performance of the memory storage device 10 matches the performance requirement of the host system 11. Thereafter, the memory management circuit 51 or the memory storage device 10 may interact with the host system 11 based on the adjusted operation setting. For example, the memory management circuit 51 may receive at least one operation command from the host system 11 and execute the operation behavior (e.g., accessing the rewritable non-volatile memory module 43) corresponding to the operation command based on the adjusted operation setting. For example, the operation command may include a read command, a write command, and/or an erase command.

In an exemplary embodiment, the command CMD may carry performance requirement information from the host system 11. The performance requirement information may reflect the performance requirement of the host system 11 for the memory storage device 10. For example, the performance requirement may be related to performance, temperature, and/or I/O latency of the memory storage device 10, and the type of performance requirement of the host system 11 for the memory storage device 10 is not limited thereto.

In an exemplary embodiment, the performance requirement information may reflect the input/output delay time required by the host system 11, the storage space required by the host system 11 to be forcibly released in the idle state of the memory storage device 10, and/or the power consumption setting (e.g., the current value) of the memory storage device 10 required by the host system 11 in the low power consumption mode (e.g., the sleep, power saving, or standby mode). In addition, the information content reflected in the performance requirement information may also be adjusted according to practical requirements, which is not limited in the disclosure.

In an exemplary embodiment, the memory management circuit 51 may parse the command CMD to obtain the performance requirement information. Then, the memory management circuit 51 may adjust a portion of the operation settings of the memory storage device 10 according to the performance requirement information. According to the adjusted operation setting, the memory management circuit 51 may interact with the host system 11 on the premise of meeting the performance requirement of the host system 11. In an exemplary embodiment, according to the adjusted operation setting, the memory management circuit 51 may also improve the performance of the memory storage device 10 as much as possible on the premise of meeting the performance requirement of the host system 11.

In an exemplary embodiment, in response to the command CMD, the memory management circuit 51 may send a response RS to the host system 11. The response RS may reflect whether the memory storage device 10 may meet one or more performance requirements specified by the host system 11.

In an exemplary embodiment, assuming that the memory management circuit 51 may meet a certain performance requirement specified by the host system 11 (also referred to as the first performance requirement) by adjusting a portion of the operating settings of the memory storage device 10, then the response RS may carry response information (also referred to as first response information) corresponding to the first performance requirement. For example, the first response information may include an information bit (also referred to as a first information bit). For example, the bit value of the first information bit may be "1". According to the first response information in the response RS, the host system 11 may determine that the memory storage device 10 may meet the first performance requirement specified by the host system 11.

In an exemplary embodiment, assuming that the memory management circuit 51 cannot meet a certain performance requirement specified by the host system 11 (also referred to as the second performance requirement) by adjusting a portion of the operating settings of the memory storage device 10, then the response RS may carry response information (also referred to as second response information) corresponding to the second performance requirement. For example, the second response information may include an information bit (also referred to as a second information bit). For example, the bit value of the second information bit may be "0". According to the second response information in the response RS, the host system 11 may determine that the memory storage device 10 cannot meet the second performance requirement specified by the host system 11.

In an exemplary embodiment, in response to the command CMD, the memory management circuit 51 may adjust (e.g., increase or decrease) at least one of the idle time threshold and the low power consumption current value of the memory storage device 10, to meet the performance requirements of the host system 11. The idle time threshold may be configured to control the time point when the memory storage device 10 enters a low power consumption mode (e.g., the sleep, power saving, or standby mode). For example, assuming that the time length of the memory storage device 10 in the idle state exceeds the idle time threshold, the memory management circuit 51 may control the memory storage device 10 to enter a low power consumption mode. In addition, the low power consumption current value may be configured to control the current value (or power consumption value) of the memory storage device 10 operating in the low power consumption mode.

In an exemplary embodiment, in response to the command CMD, the memory management circuit 51 may adjust the behavior mode of the memory storage device 10 corresponding to at least one operation command from the host system 11 to meet the performance requirement of the host system 11.

Taking the recycling operation as an example, when the memory storage device 10 executes the write command from the host system 11, the recycling operation may be performed in the background of the memory storage device 10, so as to move valid data from at least one physical unit (also referred to as a source physical unit) to another physical unit (also referred to as a target physical unit). If the valid data stored in a source physical unit is completely moved, the source physical unit may be erased and set as a new idle physical unit (e.g., added to the spare area 602 in FIG. 6).

In an exemplary embodiment, in response to the command CMD, the memory management circuit 51 may adjust the operation setting of the recycling operation to meet the I/O delay time required by the host system 11. For example, when the I/O delay time required by the host system 11 is relatively short, the memory management circuit 51 may reduce the amount of valid data collected by the recycling operation (equivalent to reducing the total number of source physical units), so as to reduce the delay caused by the recycling operation executed in the background to the write command currently executing in the foreground. Alternatively, when the I/O delay time required by the host system 11 is relatively long, the memory management circuit 51 may increase the amount of valid data collected by the recycling operation (equivalent to increasing the total number of source physical units), so as to increase the execution efficiency of the recycling operation executed in the background. In addition, in different operating scenarios, the type and adjustment method of the adjustable operating parameters of the memory management circuit 51 may also be set according to practical requirements, which are not limited by the disclosure.

In an exemplary embodiment, after receiving the command CMD, the memory management circuit 51 may determine to adjust specific operation settings in the memory storage device 10 through a look-up table or by calculating through an algorithm. In this way, in the subsequent interaction between the memory storage device 10 and the host system 11, the adjusted operation settings may meet the performance requirements of the host system 11 for the memory storage device 10. Relevant look-up tables or algorithms may be configured according to practical requirements, which are not limited by the disclosure.

Figure 8:
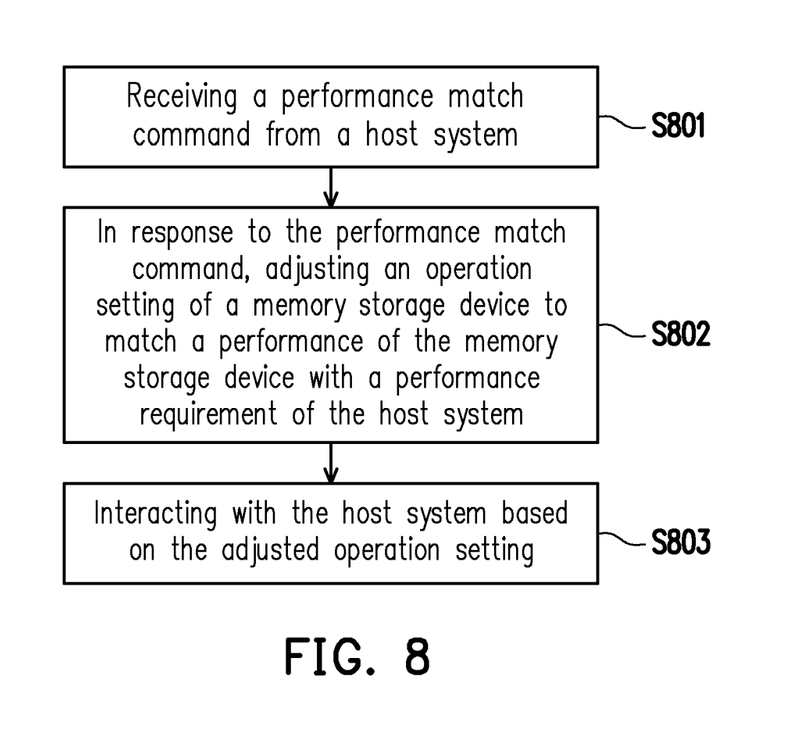
FIG. 8 is a performance match method of a memory according to an embodiment of the disclosure.

FIG. 8 is a performance match method of a memory according to an embodiment of the disclosure Referring to FIG. 8, in step S801, a performance match command is received from the host system. In step S802, in response to the performance match command, the operation setting of the memory storage device is adjusted so that the performance of the memory storage device matches the performance requirement of the host system. In step S803, the host system is interacted with based on the adjusted operation setting.

However, each step in FIG. 8 has been described in detail as above, and are not repeated herein. It should be noted that each of the steps in FIG. 8 may be implemented as multiple program codes or circuits, and the disclosure is not limited thereto. In addition, the method in FIG. 8 may be used in conjunction with the above-mentioned exemplary embodiments, or may be used alone, and the disclosure is not limited thereto.

To sum up, after receiving the performance match command from the host system, the operation setting of the memory storage device may be dynamically adjusted in response to the performance match command, so that the performance of the memory storage device matches the performance requirement of the host system. Thereafter, the memory storage device may interact with the host system based on the adjusted operation setting. In this way, no matter what the original factory settings are, the performance of the memory storage device may be dynamically adjusted to meet the requirements of the host system, thereby improving the operating performance of the memory storage device and/or avoiding compatibility problems between the memory storage device and the host system after leaving the factory.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A performance match method of memory, configured in a memory storage device, the performance match method of the memory comprising:
receiving a performance match command from a host system, wherein the performance match command is configured to provide performance requirement information of the host system to the memory storage device, and the performance requirement information reflects at least one of storage space required by the host system to be forcibly released in an idle state of the memory storage device, and a current value of the memory storage device required by the host system in a low power consumption mode;
in response to the performance match command, adjusting an operation setting of a memory storage device to match a performance of the memory storage device with a performance requirement of the host system; and
interacting with the host system based on an adjusted operation setting.

2. The performance match method of the memory according to claim 1, wherein in response to the performance match command, adjusting the operation setting of the memory storage device comprises:
parsing the performance match command to obtain the performance requirement information; and
adjusting the operation setting of the memory storage device according to the performance requirement information.

3. The performance match method of the memory according to claim 1, wherein in response to the performance match command, adjusting the operation setting of the memory storage device comprises:
adjusting at least one of an idle time threshold and a low power consumption current value of the memory storage device to meet the performance requirement of the host system.

4. The performance match method of the memory according to claim 1, wherein in response to the performance match command, adjusting the operation setting of the memory storage device comprises:
adjusting a behavior mode of the memory storage device corresponding to at least one operation command from the host system to meet the performance requirement of the host system.

5. The performance match method of the memory according to claim 1, further comprising:
in response to the performance match command, sending a response to the host system,
wherein the response reflects whether the memory storage device meets the performance requirement of the host system.

6. A memory storage device, comprising:
a connection interface unit, configured to couple to a host system;

a rewritable non-volatile memory module; and a memory control circuit unit, coupled to the connection interface unit and the rewritable non-volatile memory module, wherein the memory control circuit unit is configured to:

receive a performance match command from the host system, wherein the performance match command is configured to provide performance requirement information of the host system to the memory storage device, and the performance requirement information reflects at least one of storage space required by the host system to be forcibly released in an idle state of the memory storage device, and a current value of the memory storage device required by the host system in a low power consumption mode;

in response to the performance match command, adjust an operation setting of a memory storage device to match a performance of the memory storage device with a performance requirement of the host system; and interact with the host system based on an adjusted operation setting.

7. The memory storage device according to claim 6, wherein the memory control circuit unit adjusting the operation setting of the memory storage device in response to the performance match command comprises:

parsing the performance match command to obtain the performance requirement information; and adjusting the operation setting of the memory storage device according to the performance requirement information.

8. The memory storage device according to claim 6, wherein the memory control circuit unit adjusting the operation setting of the memory storage device in response to the performance match command comprises:

adjusting at least one of an idle time threshold and a low power consumption current value of the memory storage device to meet the performance requirement of the host system.

9. The memory storage device according to claim 6, wherein the memory control circuit unit adjusting the operation setting of the memory storage device in response to the performance match command comprises:

adjusting a behavior mode of the memory storage device corresponding to at least one operation command from the host system to meet the performance requirement of the host system.

10. The memory storage device according to claim 6, wherein the memory control circuit unit is further configured to:

in response to the performance match command, sending a response to the host system, wherein the response reflects whether the memory storage device meets the performance requirement of the host system.

11. A memory control circuit unit, configured to control a memory storage device, the memory control circuit unit comprising:

a host interface, configured to couple to a host system;

a memory interface, configured to couple to a rewritable non-volatile memory module; and a memory management circuit, coupled to the host interface and the memory interface, wherein the memory management circuit is configured:

receive a performance match command from the host system, wherein the performance match command is configured to provide performance requirement information of the host system to the memory storage device, and the performance requirement information reflects at least one of storage space required by the host system to be forcibly released in an idle state of the memory storage device, and a current value of the memory storage device required by the host system in a low power consumption mode;

in response to the performance match command, adjust an operation setting of a memory storage device to match a performance of the memory storage device with a performance requirement of the host system; and interact with the host system based on an adjusted operation setting.

12. The memory control circuit unit according to claim 11, wherein the memory management circuit adjusting the operation setting of the memory storage device in response to the performance match command comprises:

parsing the performance match command to obtain the performance requirement information; and adjusting the operation setting of the memory storage device according to the performance requirement information.

13. The memory control circuit unit according to claim 11, wherein the memory management circuit adjusting the operation setting of the memory storage device in response to the performance match command comprises:

adjusting at least one of an idle time threshold and a low power consumption current value of the memory storage device to meet the performance requirement of the host system.

14. The memory control circuit unit according to claim 11, wherein the memory management circuit adjusting the operation setting of the memory storage device in response to the performance match command comprises:

adjusting a behavior mode of the memory storage device corresponding to at least one operation command from the host system to meet the performance requirement of the host system.

15. The memory control circuit unit according to claim 11, wherein the memory management circuit is further configured to:

in response to the performance match command, sending a response to the host system, wherein the response reflects whether the memory storage device meets the performance requirement of the host system.

* * * * *